Jan. 23, 1945.                O. C. WALLEY                    2,367,981
                           REGULATING SYSTEM
                          Filed Jan. 19, 1943
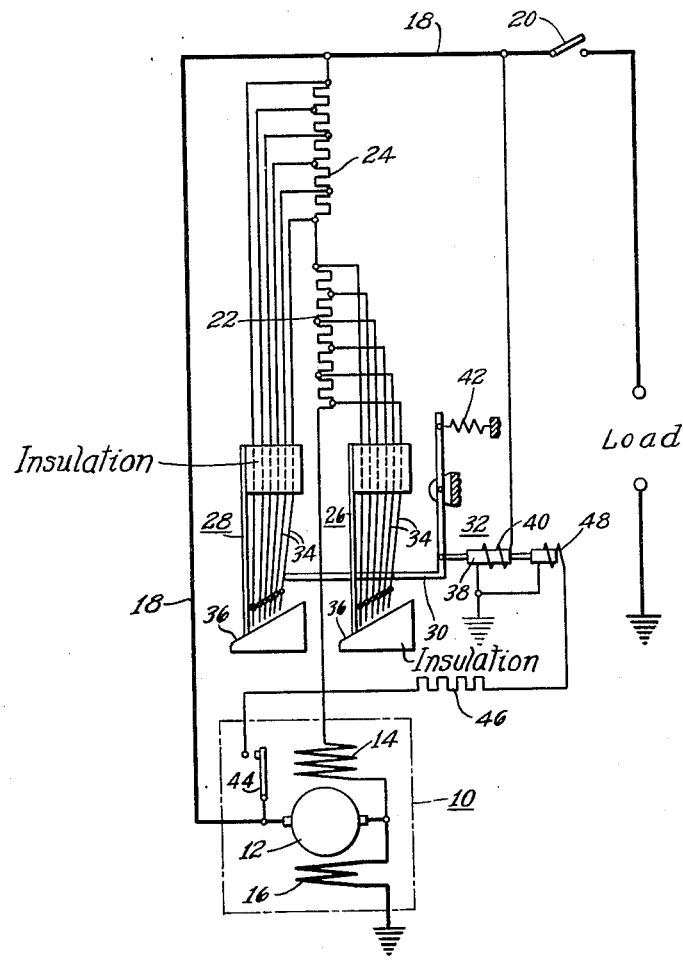
WITNESSES:                                              INVENTOR
                                                     Omar C. Walley.
                                                         BY
                                                            ATTORNEY Patented Jan. 23, 1945

2,367,981

UNITED STATES PATENT OFFICE 2,367,981

REGULATING SYSTEM

Omar C. Walley, Lima, Ohio, assignor to Westinghouse Electric & Manufacturing Company, East Pittsburgh, Pa., a corporation of Pennsylvania Application January 19, 1943, Serial No. 472,819

2 Claims. (Cl. 171—229)

This invention relates to voltage regulating systems.

It is an object of this invention to provide a voltage regulating system having an auxiliary control operable under predetermined conditions for accelerating a voltage corrective action to prevent or limit overloading the machine which is being regulated.

Another object of this invention is to provide in a voltage regulating system for a generator for effecting a corrective regulating action in response to a predetermined temperature change of the generator to prevent the overloading thereof.

Other objects of this invention will become apparent from the following description when taken in conjunction with the accompanying drawing, the single figure of which is a diagrammatic view of apparatus and circuits embodying the teachings of this invention.

Referring to the drawing, there is illustrated a regulating system embodying overload protection for a generator 10 which is disposed to be driven by any suitable prime mover (not shown). The generator 10 may be of any type or as illustrated, be of the type commonly employed in aircraft and comprises an armature winding 12, a shunt field winding 14 and a series field winding 16. As illustrated, one side of the armature winding 12 is disposed to be connected through the conductor 18 and the manual switch 20 to a load (not shown) and from thence to ground, the other side of the armature winding 12 being connected through the series field winding 16 to ground.

The shunt field winding 14 is connected at one end to one side of the armature winding 12, the other end being connected through resistors 22 and 24 which form a field rheostat to the conductor 18 and the other side of the armature winding. The connections to shunt or connect the different sections of the resistors 22 and 24 in circuit relation with the shunt field winding 14 are controlled by a plurality of switching units 26 and 28 respectively, which are actuated in a predetermined manner by a pivotally mounted driver member 30 in response to the energization of an electromagnet 32.

The switching units 26 and 28 and the manner of operating them to obtain a progressive but staggered operation thereof to obtain a progressive but staggered shunting or connecting of the sections of resistors 22 and 24 respectively, are disclosed in the copending application Serial No. 415,614, filed October 18, 1941, of R. C. Jones, now issued as Patent No. 2,326,036, which is assigned to the assignee of this invention.

Primarily each of the units 26 and 28 comprises a plurality of conducting leaf spring members 34 having one end fixed and the other end carrying a contact member or button and being normally self-biased to seat against a sloped stop 36. The fixed ends of the conducting spring members 34 are connected to different taps along the resistor associated with the respective switching units 26 and 28. The spring leaves 34 of the units 26 and 28 are so assembled, or the driver member 30 is so constructed, as to obtain a progressive but staggered operation of the leaf members 34 of the two units when the driver member 30 is actuated, as disclosed and claimed in the Jones patent identified hereinbefore.

The electromagnet 32 comprises a core member 38 connected at one end to the pivotally mounted driver member 30 and normally energized by the main coil winding 40. The main energizing coil 40 is connected at one end to the conductor 18, the other end being connected to ground, and when energized functions to pull the driver member 30 about its pivot against the pull of the biasing spring 42. Thus the energizing coil 40 is connected in shunt with respect to the load and its energization is a measure of the voltage drop across the load.

In order to protect the generator 10 against overload, a thermostat 44 is mounted or associated with the field winding of the generator so that it is responsive to temperature changes thereof. As illustrated, one end of the thermostat is connected to conductor 18, the thermostat being normally in an open circuit position. The thermostat 44 is so selected that upon an increase in temperature to some predetermined temperature such as results when an overload is encountered, the thermostat is actuated to a circuit closing position, to close a circuit extending from the conductor 18 through the thermostat 44, a resistor 46, and an auxiliary energizing coil 48 mounted on the core of the electromagnet 32 in cooperative relation with the main coil 40 to ground. When energized, the coil 48 functions to increase the pull on the driver member 30 to connect more resistance in circuit with the shunt field winding 14 of the generator to decrease the generator output.

In operation, assuming that the generator 10 is driven to deliver a predetermined voltage and the manual switch 20 is in circuit closing position, then the main coil 40 of the electromagnet 32 is energized to operate the switching units 26 and 28 in a predetermined manner whereby a number of the sections of the resistors 22 and 24 respectively, are connected in series circuit relation with the shunt field winding 14. If for any reason the load supplied by the generator 10 is changed, for example, if the load is decreased, then the coil or winding 40 is energized to actuate the driver member 30 against the bias of its spring member 42 to effect a progressive but staggered release of the leaf members 34 of the switching units 26 and 28 to alternately control the connecting of the progressive sections of the resistor elements 22 and 24 respectively, in series circuit with the field winding 14 to effect a decrease in the energization of the field winding 14 and thereby decrease the voltage of the generator 10.

If, on the other hand, the load is increased, then the coil or winding 40 is so deenergized that the driver member 30 is actuated under the influence of the spring member 42 to effect a switching operation of the switching units 26 and 28 to force their leaf members 34 progressively, but staggered, away from their sloped stops 36 to progressively but in staggered relation, to shunt the resistor sections of the associated resistors 22 and 24 respectively. This operation to effect the alternate shunting of progressive sections of each of the resistors 22 and 24 from circuit with the field winding 14 effects an increase in the energization of the field winding and consequently, an increase in the voltage of the generator 10.

If during the operations described hereinbefore the generator should become overloaded so as to effect an increase in temperature, then at some predetermined temperature the thermostat 44 is actuated to close the circuit to effect the energization of the auxiliary coil 48 mounted on the core member 38 of the electromagnet 32. The energization of the coil 48 effects a magnetic pull in addition to that of the main coil 40 to actuate the driver member 30 against the bias of its spring member 42 to effect the progressive, but staggered, release of the leaf spring members 34 of the switching units 26 and 28 to thereby progressively but alternately connect additional sections of the resistors 22 and 24 respectively, in circuit with the field winding 14 to decrease the energization of the field winding and thereby decrease the generator output. When the condition which tends to place the overload upon the generator 10 is removed or the temperature of the generator approaches normal operating temperature, the thermostat 44 is actuated to its normally open circuit position whereby the coil 48 is deenergized and the operation of the switching units 26 and 28 is controlled by only the main energizing coil 40.

This system provides an efficient regulating system for the generator while at the same time providing overload protection, thereby preventing damage to the apparatus utilized. It is efficient and simple in its operation, having very little mechanical parts which require adjustment in operation.

Although this invention has been described with reference to a particular embodiment thereof, it is, of course, not to be limited thereto except insofar as is necessitated by the scope of the appended claims.

I claim as my invention:

1. In a voltage regulating system, in combination, a generator the voltage of which is to be regulated, a field winding for exciting the generator, a resistor having a plurality of resistor sections disposed to be connected in series circuit relation with the field winding, means for progressively varying the number of resistor sections connected in circuit with the field winding, means for actuating the progressive varying means, the actuating means comprising a main control winding responsive to the generator voltage and an auxiliary control winding, and temperature responsive means associated with the generator disposed to effect the energization of the auxiliary control winding under predetermined conditions, the main control winding and the auxiliary control winding being disposed to produce an additive magnetic pull when energized to actuate the varying means in one direction to progressively connect the resistor sections to prevent overloading the generator.

2. In a voltage regulating system, in combination, a generator the voltage of which is to be regulated, a field winding for exciting the generator, two resistor units connected in series circuit relation with each other and the field winding, each of the resistor units having a plurality of resistor sections, means associated with each of the resistor units disposed for varying the number of sections connected in circuit with the field winding in a progressive but staggered relation, means for actuating the varying means, the actuating means comprising a main control winding responsive to the generator voltage and an auxiliary control winding, and temperature responsive means associated with the generator disposed to effect the energization of the auxiliary control winding under predetermined conditions, the main control winding and the auxiliary control winding being disposed to produce an additive magnetic pull when energized to actuate the varying means in one direction to progressively connect the resistor sections of the resistor units in a progressive but staggered relation to prevent overloading the generator.

OMAR C. WALLEY.